United States Patent

[11] 3,576,162

| [72] | Inventor | William J. McBrady Hazelcrest, Ill. |
|---|---|---|
| [21] | Appl. No. | 770,212 |
| [22] | Filed | Oct. 24, 1968 |
| [45] | Patented | Apr. 27, 1971 |
| [73] | Assignee | Smeco Industries, Inc. Chicago, Ill. |

[54] MEAT PRESS
2 Claims, 3 Drawing Figs.

[52] U.S. Cl. .................................................. 100/53, 53/124, 100/218, 100/269
[51] Int. Cl. .................................................. B30b 15/00
[50] Field of Search .......................................... 100/52, 53, 218, 269, 232; 53/124; 141/73, 80

[56] References Cited
UNITED STATES PATENTS

| 2,029,984 | 2/1936 | Buttfield et al. | 100/53 |
|---|---|---|---|
| 2,334,774 | 11/1943 | Jordan | (100/218UX) |
| 3,024,720 | 3/1962 | Welsh | 100/53 |
| 3,040,654 | 6/1962 | Opie | 100/53 |
| 3,384,007 | 5/1968 | Boje et al. | (100/53UX) |

*Primary Examiner*—Billy J. Wilhite
*Attorney*—Parker, Carter & Markey

ABSTRACT: An automatic meat press assembly including a press chamber, a ram movable into the chamber to press meat therein and an ejector, a chamber safety door and means precluding operation of the assembly when said door is open; means precluding operation of the ejector when the ram is out of pressing position; means precluding operation of at least the ejector when a casing is absent from the assembly and an automatic conveyor including means productive of operation of a ram and ejector in response to operation of said conveyor.

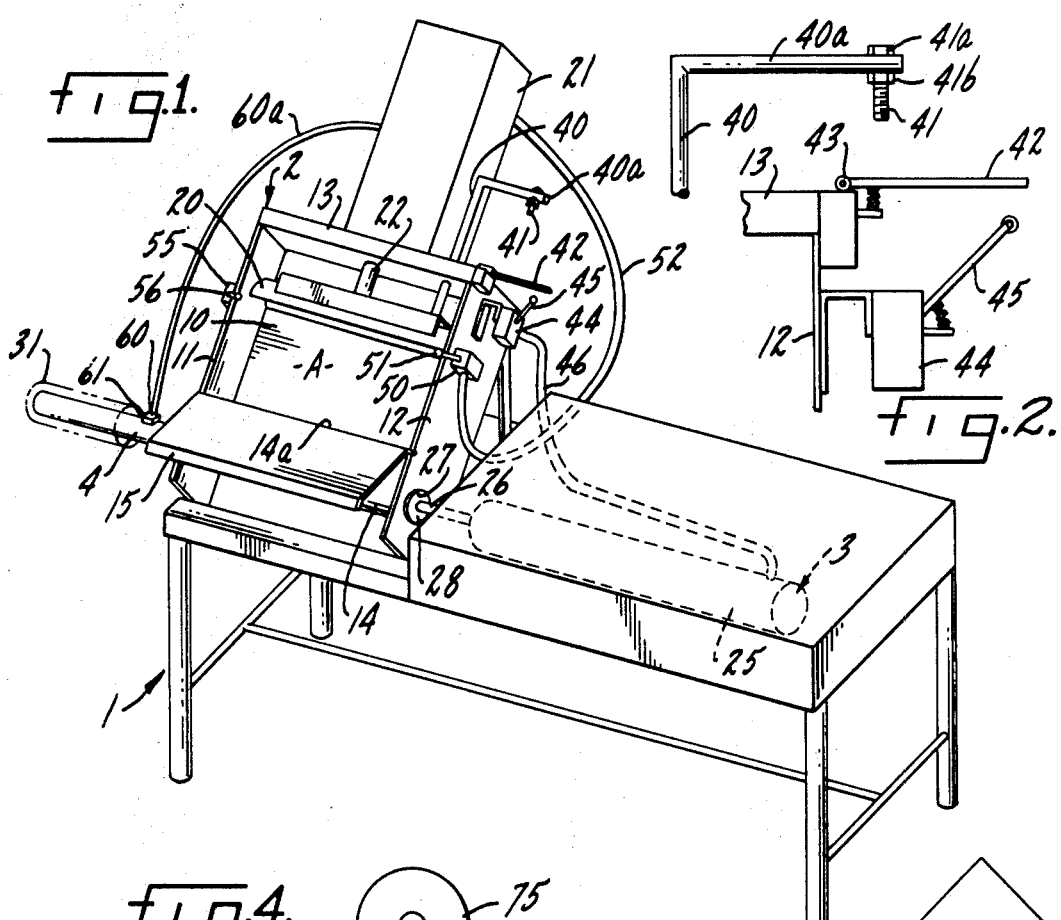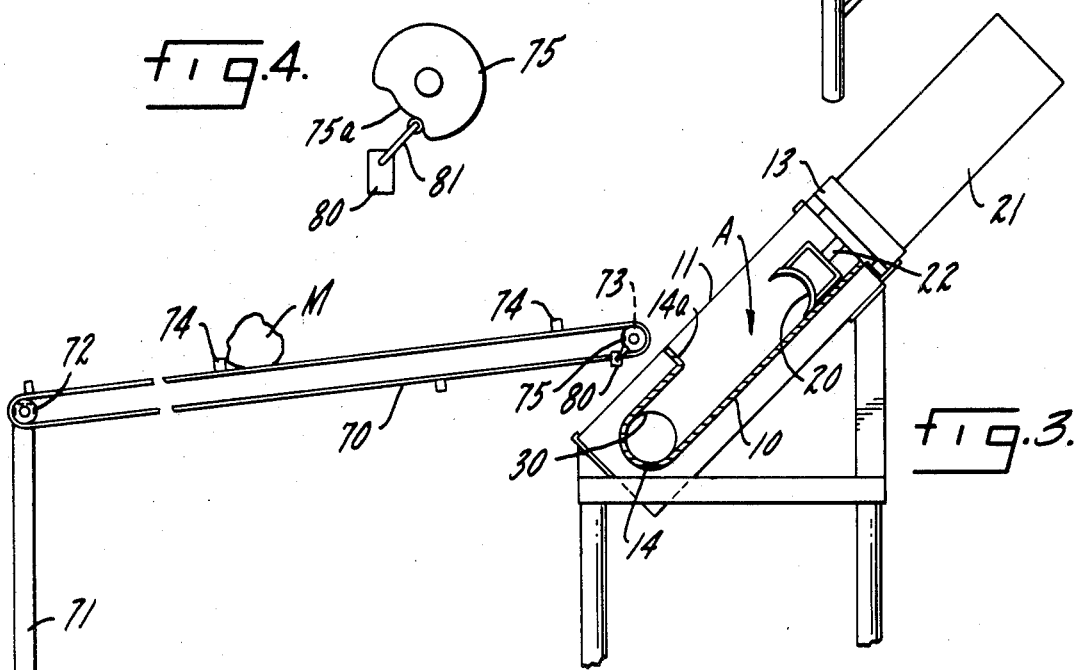

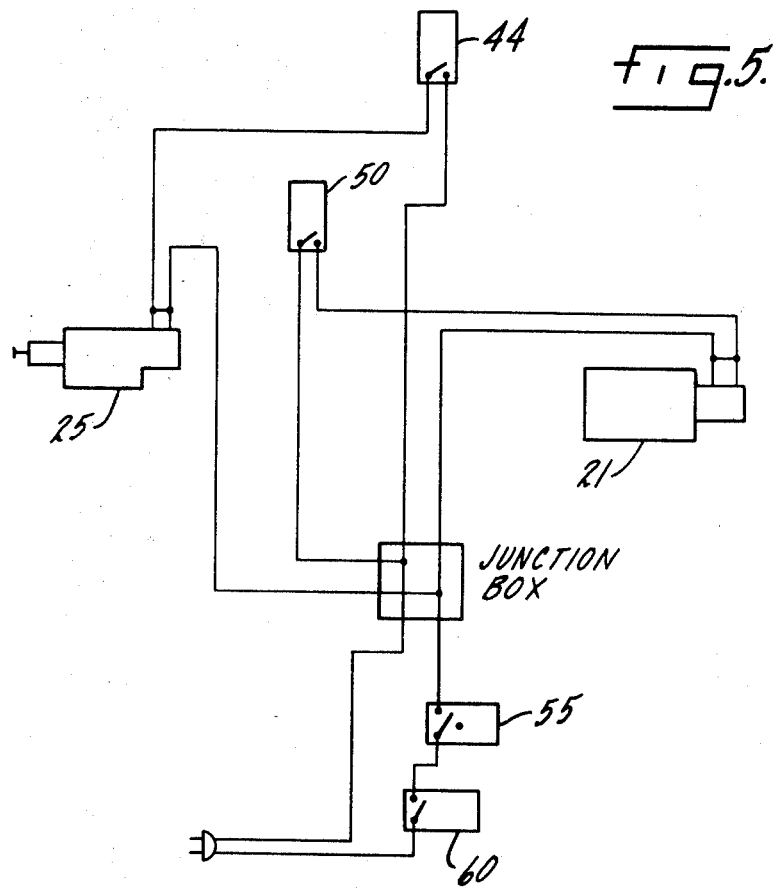

MEAT PRESS

SUMMARY OF THE INVENTION

A meat press wherein a press chamber has a ram positioned for movement thereinto to press meat therewithin; an ejector positioned for movement thereinto to eject pressed meat therefrom and a casing-receiving horn for passage of meat into said casing, one version of the invention including a safety door for said chamber and electrical elements responsive to the closing of said door to actuate said ram, responsive to the desired location of said ram in press position to actuate said ejector, a version of the invention including a conveyor positioned to deliver meat to said chamber for pressing and means responsive to the position of said conveyor to actuate said ram, and means effective in response to the absence of a casing from said horn to render the assembly of the invention inoperable.

This invention relates to meat processing equipment and has particular relation to meat presses and the like.

Meat presses have conventionally employed a press chamber, a ram operable by manual manipulation of a screw drive or fluid valve to move the ram toward meat-pressing position in the chamber and a separably manually operable ejector member for moving the pressed meat out of the chamber and through a horn in to a casing carried by said horn. When, however, the ejector is operated with the ram out of its precise pressing location, meat scraps remain in the ram and chamber assembly and the casing can receive less than the desired meat quantity. Operation of such assemblies with a meat casing absent results in wastage of meat. Manual delivery of meat to the chamber and manual operation of the assembly thus entails costs and delays. Hence it is one purpose of the invention to provide a meat press assembly effective to preclude wastage of meat.

Another purpose of the invention is to provide a rapid, automatic meat press and casing-filling assembly capable of volume production and substantially free of human error.

Another purpose is to provide a meat conveying, pressing and casing filling assembly effective automatically to deliver meat to a pressing assembly, to press said meat in response to the position of said conveyor and to move said meat from said pressing assembly to said casing in response to the position of said pressing assembly.

Another purpose is to provide a meat press and means precluding its operation under predetermined conditions.

Another purpose is to provide a meat press assembly and means precluding operation of some elements thereof until other elements thereof are in a predetermined position.

Another purpose is to provide a meat press assembly of maximum economy in manufacture and use and of maximum simplicity in construction.

Other purposes may appear from time to time during the course of the specification and claims.

BRIEF DESCRIPTION OF THE DRAWINGS

The invention is illustrated more or less diagrammatically in the accompanying drawings wherein:

FIG. 1 is a perspective view;

FIG. 2 is a detail view on an enlarged scale;

FIG. 3 is a side elevation in partial cross section of a variant form;

FIG. 4 is a detail view on an enlarged scale; and

FIG. 5 is a schematic electrical showing.

Like parts are indicated by like numerals throughout the specification and drawings.

DESCRIPTION OF THE PREFERRED EMBODIMENT

Referring now to the drawings, and particularly to FIG. 1, numeral 1 generally designates a frame or support for the assembly of the invention. Carried on the frame 1 and rising in an upwardly inclined plane therefrom is a meat press assembly generally designated by the numeral 2. Also carried on the frame 1 alongside the press 2 is an ejector assembly generally designated by the numeral 3. Carried by and projecting from the assembly 2, in alignment with the ejector 3, is a casing-receiving horn 4.

Considering first the press assembly 2, it will be observed that a press chamber A is defined by a base wall 10 from which a pair of parallel sidewalls 11,12 project. A top cross wall 13 joins the walls 10, 11 and 12. A lower or bottom wall 14 extends between the walls 11,12 in spaced relation to the wall 13. As may be best seen, for example, in FIG. 3, the bottom or lowermost wall segment 14 is concave. The wall 14 joins, and may be formed integrally with, the base wall 10 and terminates in an upper wall portion 14a, the forward edge of which is spaced from wall 13 to define a meat-receiving opening for chamber A. In the form of the invention illustrated in FIG. 1, the assembly 2 includes a safety door 15 hinged at the forward edge 14a of wall 14 and formed and positioned to substantially close said chamber opening.

Assembly 2 includes a meat press ram having the concave ram wall 20 extending between the walls 11,12 and diminished for tight sliding reception between the sidewalls joining concave wall 14, one edge of the ram wall 20 being in sliding engagement with the inner surface of wall 10, the opposite edge of ram wall 20 being in sliding engagement with the wall portion terminating in edge 14a. A fluid motor, which may conveniently take the form of cylinder 21, as shown schematically in FIG. 1, has its shaft 22 extending into chamber A and carrying the ram wall 20 for reciprocation of the wall 20 within chamber A.

Ejector member 3 includes the fluid-operated motor or air cylinder 25 having its shaft 26 extending through aperture 27 in wall 12 in axial alignment with the axis of the inner diameter curve of wall 14. An ejector head or piston 28 is carried by shaft 26 and may be conveniently formed of nylon, for example, the head or piston 28 being movable along the inner surface of wall 14, as described hereinbelow.

Wall 11 is apertured as indicated at 30 in FIG. 3, the axis of aperture 30 being identical with the axis of shaft 26 and the inner diameter of wall 14 and with the axis of horn 4, the horn 4 consisting of a hollow, tubular part secured to wall 11 and extending in axial alignment with aperture 30, wall 14 and shaft 26. Indicated in dotted lines in FIG. 1 is a meat casing 31.

As may be best seen in FIGS. 1 and 2, a rod 40 is carried by the structure carrying ram wall 20 for movement with the ram 20 in response to movement of fluid motor 21 and shaft 22. The rod 40 extends through wall 13 and has an angularly disposed distal portion 40a carrying adjustably thereon a finger member 41. The member 41 may conveniently take the form of a threaded element secured by suitable fastener means such as the nuts 41a,41b to the rod portion 40a. Finger member 41 also preferably parallels rod 40 which in turn is arranged preferably in parallel relationship with shaft 22. Hingedly, yieldingly carried in its FIG. 2 position on the press assembly 2 is an intermediate finger element 42. As shown, the member 42 is hingedly carried by wall 13 as indicated at 43. Mounted also on the assembly 2 is a control element which may take the form of the microswitch 44 having a switch arm 45 extending therefrom and positioned for contact by finger element 42, the finger element 42 being positioned for contact by finger element 41. It will be understood that the switch 44 is connected by suitable electrical conductors, such as that indicated generally by the numeral 46 for example, to the ejector mechanism 3 and that the element 45 is a standard microswitch spring-biased in its FIG. 2 position.

Also mounted on assembly 2, as for example on the wall 12, is a second control member which may take the form of a microswitch 50 having a switch arm or button 51 positioned for contact by safety door 15 when the door 15 is in closed position. A suitable conductor, such as that indicated generally at 52, connects the control member 50 with the fluid motor 21.

A second control member, such as the manually operable, three-position switch 55, may be carried on wall 11 and may have a switch arm 56, the switch 55 being connected by suitable conductors (not shown) to provide for activation of the system by door 15 and switch 50 or by the automatic system described below or to deactivate the system when placed in the "off" position. Thus switch 55 may have "Manual," "Automatic" and "Off" positions. Mounted on or adjacent the horn 4 is a control member which may take the form of a microswitch 60 having a switch arm or button 61 positioned to be moved in response to the presence of a casing 31 on horn 4.

Referring now to FIG. 3, it will be observed that the automatic system includes a conveyor taking the form of a continuous belt 70 and carried on a suitable frame or support 71 for movement about end sprockets 72,73. The conveyor 70 includes upstanding flights or dams 74 spaced uniformly therealong. A cam member 75 is movable in response to movement of the conveyor belt 70 and may, for example, be rotatable with the end sprockets 72,73 as shown. A control member, which may take the form of a microswitch 80, has a switch arm 81 positioned for movement in response to movement of cam 75 as shown, for example, on an enlarged scale in FIG. 4. It will be understood that the control member 80 is connected by suitable conductors (not shown) to ram-operating motor 21.

The use and operation of the invention are as follows:

Considering first the form of the invention illustrated in FIG. 1; the operator places a supply of meat, such as that shown for example at M in FIG. 3, into the chamber A, the safety door 15 being open for this purpose. Such supply M of meat, it will be understood, will be of somewhat random shape and density but of substantially premeasured quantity. The meat M placed in chamber A will rest upon the wall 14. The operator then closes safety door 15, the closing of door 15 being effective to actuate control member switch 50 and the motor 21. Thereupon the ram or press wall 20 is moved toward wall 14 to press the meat M between walls 20 and 14 to achieve the desired shape of the resulting block of meat. In the form shown, for example, the concave walls 20 and 14 are effective to form substantially a cylinder of meat therebetween. When the wall 20 has reached the desired meat-pressing position, i.e. its maximum desired approach to wall 14 to form the substantially perfect cylinder desired, the finger 41, movable with the wall 20, will, at that moment, have moved intermediate finger 42 into actuating contact with arm 45 of control member 44. The consequent actuation of ejector cylinder 25 moves ejector head or piston 28 through the cylinder formed by walls 20 and 14 to move the meat M, now in the form of a cylinder, through the aperture 30 and horn 4 into casing 31. It will be understood that apertures 27 and 30 in the walls 12,11, respectively, are of a diameter substantially equal to the inner diameter of the cylinder formed by walls 20 and 14 when the wall 20 is in the desired foremost point of its excursion. It will be further realized that the head 28 has an outer diameter such as to provide for snug, sliding contact or engagement with the inner diameter of apertures 27 and 30 and with the inner surfaces of the walls 20 and 14.

Thus the elements 40—46, inclusive are effective to preclude ejection of meat from chamber A before said meat has reached its fully compressed state and to insure that all of the meat between walls 20 and 14 will be ejected from chamber A. It is unnecessary for the operator to operate the ram wall 20 by manually operable screws or by a separably operable valve to move the ram or wall 20 toward its press position and it is unnecessary for the operator to then separately operate the ejector mechanism 3 when, in the operator's judgement the wall 20 is in proper position. Should the safety door 15 be opened, the spring-loaded arm 51 of control member 50 would move to withdraw or retract shaft 22 and wall 20.

Elements 41,42 and 45 are interrelated to provide a micrometer type of adjustment and a precise positioning of the ram 20 in the desired lowermost position. As indicated above, the accuracy of such positioning is important in preventing understuffing of the casing or the shearing off of meat scraps. With the elongated arm 42 contacted adjacent pivot 43 by finger 41, it will be realized that the final minute movement of ram 20 is multiplied and can be controlled with greater accuracy and precision.

Referring now to control member 60, the arm 61 may be actuated by the operator's s hand (not shown) in holding the casing 31 on horn 4 or the arm 61 may be moved by any suitable mechanism serving to retain the casing 31 on horn 4. Conductor 60a connects member 60 with motor 21 and, through suitable circuitry, the member 60 is effective, upon such movement of arm 61, to energize the system for operation of motor 21. If the spring-loaded arm 61 is not so moved, i.e. no casing is present on horn 4, the motor 21 is rendered inoperative. Thus closure of door 15 will not activate motor 21 and fingers 42,41 will not be moved to activate ejector mechanism 3.

Referring now to FIGS. 3 and 4, it will be understood that the cam surface 75a of cam member 75 is so designed, in relationship to switch arm 81, the speed of movement of conveyor 70, the spacing of flights or dams 74 and the speed and sequential operating relationships of fluid motors 21 and 25, to insure that a supply M of meat is delivered by conveyor 70 to chamber A, the arm 81 is moved by cam 75 and through conductors (not shown) connecting control member 80 to motor 21, the ram wall 20 is moved into meat-pressing position, the ejector cylinder 25 is activated to move the pressed meat cylinder into horn 4 and the ram 20 and ejector head 28 are withdrawn into their retracted positions prior to arrival of the next flight 74 and meat supply M at its point of delivery into chamber A from the conveyor 70. Since the conveyor 70 delivers directly to chamber A, no safety door effective to prevent injury is required. In the form of the invention shown in FIG. 1 it will be realized that the hands of the operator are precluded from injury by the ram wall 20 since the wall 20 is immovable whenever the safety door 15 is open. With the door closed, it is impossible for the operator to place his hands in a position to be injured by the wall 20 or ejector 3.

The control assembly 60, 61, 60a and the sequential operating elements 40—46, inclusive, are employable in the form of the invention illustrated in FIGS. 3 and 4, though, for clarity, these elements are not shown in said FIGS.

I claim:

1. A meat processing assembly including a chamber, opposed, relatively movable wall members positioned for relative movement together to press meat into a shape corresponding to said wall members within said chamber, means for moving at least one of said wall members, an ejector head movable between said wall members to eject meat therefrom, and means responsive to the positioning of said wall members in predetermined, meat-pressing position to operate said ejector head, said last-named means including a finger movable with said one of said wall members, an elongated bar pivoted adjacent said chamber, an electrical switch member positioned for actuation by said bar adjacent a distal end of said bar, said finger being positioned for actuating contact with said bar adjacent the pivot of said bar to urge said bar toward said switch member.

2. A meat press including a press chamber, a fixed press wall in said chamber, a movable press wall in said chamber, said fixed and movable walls defining therebetween a desired meat shape, a first motor for moving said movable wall, means for actuating said motor, an ejector mechanism movable between said walls to eject meat from said chamber, a second motor for moving said ejector mechanism, and control means insuring automatic activation of said ejector mechanism in meat-ejecting direction when said movable wall is in its predetermined meat-pressing position and precluding activation of said ejection mechanism in meat-ejecting direction when said movable wall is not in said position, said last-named means including a control member operatively connected with said ejection mechanism and a finger element movable with said movable wall and positioned to actuate said control member when said movable wall reaches said predetermined position, said first motor-actuating means comprising a safety door movable into a position closing said chamber, and a second control member positioned adjacent said chamber for actuation by said door when said door is in its chamber-closing position, said second control member being connected to said first motor and effective to energize said first motor when said door is closed.